US011236025B2

(12) United States Patent
Savinelli et al.

(10) Patent No.: US 11,236,025 B2
(45) Date of Patent: Feb. 1, 2022

(54) METHODS FOR IMPROVING CONTROL OF INSECTS AND RELATED COMPOSITIONS

(71) Applicants: Syngenta Participations AG, Basel (CH); Catherine Savinelli, Greensboro, NC (US); Erin Leann Richmond, Greensboro, NC (US)

(72) Inventors: Catherine Savinelli, Greensboro, NC (US); Erin Leann Richmond, Greensboro, NC (US)

(73) Assignee: SYNGENTA PARTICIPATIONS AG, Basel (CH)

(*) Notice: Subject to any disclaimer, the term of this patent is extended or adjusted under 35 U.S.C. 154(b) by 0 days.

(21) Appl. No.: 14/775,829

(22) PCT Filed: Mar. 13, 2014

(86) PCT No.: PCT/US2014/025480
§ 371 (c)(1),
(2) Date: Sep. 14, 2015

(87) PCT Pub. No.: WO2014/151328
PCT Pub. Date: Sep. 25, 2014

(65) Prior Publication Data
US 2016/0023961 A1    Jan. 28, 2016

Related U.S. Application Data

(60) Provisional application No. 61/791,356, filed on Mar. 15, 2013.

(51) Int. Cl.
C05G 3/60      (2020.01)
A01N 53/00     (2006.01)
A01N 25/30     (2006.01)
C05B 17/00     (2006.01)

(52) U.S. Cl.
CPC ............ *C05G 3/60* (2020.02); *A01N 25/30* (2013.01); *A01N 53/00* (2013.01); *C05B 17/00* (2013.01)

(58) Field of Classification Search
CPC ........ A01N 25/04; A01N 25/30; A01N 53/00; A01N 59/00; A01N 59/02; A01N 59/08; A01N 59/26; C05B 17/00; C05G 3/02; C05G 5/20; C05G 5/23; C05G 5/27; A01C 7/06
See application file for complete search history.

(56) References Cited

U.S. PATENT DOCUMENTS

| | | | | |
|---|---|---|---|---|
| 5,407,134 A | * | 4/1995 | Thompson | A01M 7/0092 111/118 |
| 6,289,829 B1 | * | 9/2001 | Fish | A01C 5/064 111/121 |
| 2011/0077155 A1 | | 3/2011 | Goodwin | |
| 2011/0105332 A1 | * | 5/2011 | Cush | A01N 25/30 504/359 |

FOREIGN PATENT DOCUMENTS

| | | |
|---|---|---|
| WO | 2006/124508 A1 | 11/2006 |
| WO | 2012/109522 | 8/2012 |
| WO | 2007/089346 A2 | 8/2016 |

OTHER PUBLICATIONS

Mallarino, "Phosphorus and Potassium Placement Methods for Corn and Soybean: An Iowa Perspective", 2009, Proc. of the 2009 Wisconsin Crop Management Conference, vol. 48, pp. 109-115.*
Anon.: "Capture LFR insecticide", Dec. 31, 2007, p. 1-2, Retrieved from the Internet: URL:http://agfax.com/southerngrain/2010/sponsored/fmc/pdf-links/capture-lf-tech-sheet.pdf.*
Ramsel et al., "Starter Fertilizer, Row Width, and Planting Date Effects on Corn Yield in North Central Iowa", 2001, Iowa State Research Farm Progress Reports, 1808. (Year: 2001).*
International Search Report for International Patent Application No. PCT/US2014/25480 dated Jul. 3, 2014.
Anon.: "Capture LFR insecticide", Dec. 31, 2007, p. 1-2, Retrieved from the Internet: URL:http://agfax.com/southerngrain/201O/sponsored/fmc/pdf-links/capture-lf-tech-sheet.pdf.
Ciampitti, I. A. et al.: "A comprehensive study of plant density consequences on nitrogen uptake dynamics of maize plants from vegetative to reproductive stages", Field Crops Research, vol. 121, No. 1, Oct. 22, 2010, p. 2-18, ISSN: 0378-4290, DOI: 10.1016/J.FCR.2010.10.009.
Beegle, D. et al.: "Starter Fertilizer", Agronomy Facts 51, Dec. 31, 2007, p. 1-6, http://extension.psu.edu/plants/crops/grains/corn/nutrition/starter-fertilizer/extension_publication_file.
Eisley, B.: "Corn Rootworm Larval Control with Soil Insecticides, 2008", Jan. 1, 2008, p. 1-3, www.oardc.ohio-state.edu/ag/reports/08si.pdf.

* cited by examiner

*Primary Examiner* — Michael B. Pallay
(74) *Attorney, Agent, or Firm* — BakerHostetler; Toni-Junell Herbert

(57) ABSTRACT

Controlling insect damage in a plant. In one embodiment, the methods include applying insecticide and at least one fertilizer in-furrow at planting. In particular examples, methods of controlling cutworms in corn include applying teflu-thrin and at least one pop-up fertilizer in-furrow at planting.

17 Claims, No Drawings

METHODS FOR IMPROVING CONTROL OF INSECTS AND RELATED COMPOSITIONS

RELATED APPLICATION INFORMATION

This application is a 371 of International Application No. PCT/US2014/025480, filed 13 Mar. 2014, which claims the benefit of U.S. Provisional Patent Application No. 61/791,356 filed 15 Mar. 2013, the contents of which are incorporated herein by reference herein.

FIELD OF THE TECHNOLOGY

The present disclosure relates generally to controlling pests, and more particularly to methods of controlling insect damage in a plant using compositions having improved insecticidal properties. The disclosure is also directed to related compositions and systems.

BACKGROUND

Applicant desires improved methods of controlling pests. For example, Applicant desires new and improved methods for controlling yield-robbing insects in agricultural crops, such as corn. Corn pests, e.g. cutworms, rootworms, corn borers, earworms, armyworms and the like, can severely impact yield in corn crops. Despite the intense amount of work devoted to controlling pests, Applicant believes yield losses such as those caused by corn pests are still a significant problem. Therefore, Applicant desires systems, methods and compositions for providing improved control of pests, particularly corn pests.

SUMMARY

The current disclosure is directed to, inter alia, methods of controlling pests. In one exemplary embodiment, the disclosure includes a method of improving control of cutworms in a plant by applying a pyrethroid insecticide and at least one pop-up fertilizer. In many embodiments, the application will occur around the time of planting e.g. within the range of at least one of ±5 days, ±4 days, ±3 days, ±2 days, ±1 day from planting. In some examples, the application will occur on the same day as planting, e.g. during the same pass through the field as the planter. Further still, in many embodiments, the application will be in-furrow.

In some embodiments, methods may include forming an insecticide composition prior to applying the composition. For instance, forming the insecticide composition may include depositing the insecticide into a first reservoir, depositing the fertilizer into a second reservoir and pumping the insecticide and the fertilizer to a mixing chamber prior to application.

Other embodiments, include insecticidal compositions, e.g. those comprising a pyrethroid insecticide, a pop-up fertilizer, and a surfactant, e.g. a phosphated arylphenol alkoxylate surfactant having an average degree of ethoxylation of from 4-8, an alkylamine alkoxylate surfactant having an average degree of alkoxylation of from 2-12, a combination thereof and the like.

The above summary was intended to summarize certain embodiments of the present disclosure. Embodiments will be set forth in more detail in the description of embodiments below. It will be apparent, however, that the description of embodiments is not intended to limit the present inventions, the scope of which should be properly determined by the appended claims.

DETAILED DESCRIPTION OF EXEMPLARY EMBODIMENTS

Referring now to the exemplary embodiments hereinafter, it will be understood that these embodiments and examples are for the purpose of describing inventions of the disclosure and are not intended to limit the disclosure or any inventions thereto.

Unexpected advantages of treatments of insecticidly-effective components and fertilizers at planting have been discovered. For instance, improved control of insect damage in a plant may be achieved by applying a pyrethroid insecticide and at least one pop up fertilizer around the time of planting. As used herein, around the time of planting, refers to an application within the range of at least one of ±5 days, ±4 days, ±3 days, ±2 days, ±1 day from planting. In some examples, the application will occur on the same day as planting, e.g. during the same pass through the field as the planter. Further still, in many embodiments, the application will be in-furrow. As used herein, in-furrow means application of the pyrethroid insecticide and at least one fertilizer in the furrow, or opening in the soil made to receive at least one seed, prior to closing the furrow.

Pyrethroid insecticides include, for example, permethrin, cypermethrin, fenvalerate, esfenvalerate, deltamethrin, cyhalothrin, lambda-cyhalothrin, bifenthrin, fenpropathrin, cyfluthrin, tefluthrin, ethofenprox, natural pyrethrin, tetramethrin, s-bioallethrin, fenfluthrin, prallethrin and 5-benzyl-3-furylmethyl-(E)-(1R,3S)-2,2-dimethyl-3-(2-oxothiolan-3-ylidene-methyl)cyclopropane carboxylate. Application rates may vary, and may include for example, pyrethroid rates in the range of 0.05 lb/acre to about 0.5 lb/acre, more preferably about 0.09 lb/acre to about 0.3 lb/acre. Other rates may also be used, e.g. labeled rates.

Pop-up fertilizers include, for example, fertilizers having an N:P:K ratio, wherein P is in the ratio range of 12-40. In many examples, pop-up fertilizers include fertilizers having an N:P:K ratio, wherein N is in the ratio range of 4-12; P is in the ratio range of 12-40; and K is in the ratio range of 1-10. Often times, the fertilizer will be a ready to use, liquid formulation. In many examples, the formulation will be a low salt formulation. Exemplary fertilizers may be used, including PhosPlus+ 9-15-4 (United Suppliers), RiseR 7-17-3 (Nortrace), 9-18-9 (Nachurs, Alpine), 9-20-3 (Low K White, Nachurs, Alpine), 6-24-6 (Nachurs, Alpine), 9-20-3 with 1% S and 0.5% Zn (Low K White, Nachurs, Alpine), 6-24-6 with 1% S and 0.5% Zn (Nachurs, Alpine), Hyper-Link 8-24-4 (Helena), and Steric-P (NAP). In many embodiments, fertilizers will contain nutrient concentrations in the range of about 1 pound per gallon (lb/gal) to about 5 lb/gal, e.g. nitrogen in the range of about 0.2 lb/gal to about 1.0 lb/gal; phosphate available in the range of about 0.8 lb/gal to about 3.0 lb/gal; and potassium available in the range of about 0.2 lb/gal to about 1.0 lb/gal. Application rates may vary and, in many examples, will include rates in the range of about 2 gal/acre to about 10 gal/acre, which may convert to nutrient application rates in the range of about 3 lb/acre to about 50 lb/acre.

Methods and compositions disclosed herein may be used to improve control a variety of insects. Significant improvements may be seen in control of, for example, cutworms, e.g. black cutworm, seed maggots, wireworms, grubs, and rootworms. Further, reduced damage may be achieved in a variety of plants, for example, corn plants, cotton plants, soybeans plants, and vegetables, as well as other field crop plants, e.g wheat and sugar beet.

In many embodiments, the pyrethroid insecticide and the pop-up fertilizer will be applied as an insecticidal composition. Weight ratios of the composition may vary, e.g. the pyrethroid and the fertilizer nutrients are applied in a weight ratio in the range of about 1:30 to about 1:500. Methods of forming the insecticidal composition may also vary. In one example, a method includes forming the pyrethroid insecticide and the pop-up fertilizer into an insecticidal composition prior to applying the liquid composition, wherein forming includes: depositing the pyrethroid insecticide, in liquid form, into a first reservoir; depositing the pop-up fertilizer, in liquid form, into a second reservoir; and pumping to a mixing chamber the pyrethroid insecticide and the fertilizer, thereby forming the insecticidal composition. The pyrethroid insecticide in the first reservoir may be present at 10-30% by weight of the liquid form. The pop-up fertilizer may be in the second reservoir such that such that, total nitrogen, is 0.2 lb/gal to 1.0 lb/gal; phosphate (e.g. $P_2O_5$) is available at 0.8 lb/gal to 3.0 lb/gal; and soluble potash (e.g. $K_2O$) is available at 0.2 lb/gal to 1.0 lb/gal. Suitable application systems include the Central Insecticide System, available from John Deere (Deere & Company).

In particular examples, any of the pyrethroid insecticides or the insecticidal composition shown and described herein may be applied with a closed-handling system. The closed-handling system may be fully integrated with the planter. For instance, bag-in-the-box embodiments of any of the insecticide compositions herein may reduce, or eliminate, after market handling. Other examples, include solid form application of the pyrethroid, e.g. in the form of a granular, and may include solid or liquid application of the fertilizer.

Either the pyrethroid insecticide or the insecticidal composition, particularly in liquid form, may further include at least one phosphated arylphenol alkoxylate surfactant having an average degree of alkoxylation of from 4-8; and at least one alkylamine alkoxylate surfactant having an average degree of alkoxylation of from 2-12. The phosphated arylphenol alkoxylate surfactants may include of one or more compounds of formula

wherein
R¹ is a substituted phenoxy;
Z is —CHR²CHR³—O—, where R² and R³, which may be the same or different, are hydrogen or methyl;
a is 4 to 8
b is 1 or 2; and
A is a phosphate radical or salts thereof.

In one embodiment, R¹ is substituted by two or three 1-phenylethyl groups. Preferably, R¹ is a tri-substituted phenoxy, substituted by a 1-phenylethyl radical at the 2, 4 and 6 positions and Z is —CH₂CH₂—O—. In the art, this compound is known as a phosphated tristyrylphenol ethoxylate.

The phosphated arylphenol alkoxylate surfactants may be produced by condensation of alkylene oxide with an aryl phenol, followed by phosphation to give an anionic surfactant. Phosphation can be performed by methods known to one of ordinary skill, for example, reacting the alkoxylated alcohol with either phosphorous pentoxide or polyphosphoric acid. The diester content of the phosphated arylphenol alkxoylates, i.e., when 'b' is 2, may range anywhere from 0 to 100% by weight of the phosphated arylphenol alkoxylates.

The phosphated arylphenol alkoxylates may also contain free non-ionic surfactant as a side product of the surfactant production product. Thus, the non-ionic surfactant content of the phosphated arylphenol alkoxylate surfactant may range anywhere from 0 to 50 percent. Further, the addition of non-ionic arylphenol alkoxylate surfactants, above the amount of non-ionic arylphenol alkoxylate surfactant present as a side product of the anionic surfactant production, is also contemplated.

The alkylamine alkoxylate surfactants comprise (i) an amine having the formula

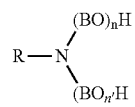

where R represents a straight- or branched-chain alkyl or alkenyl group having from about 8 to about 22 carbon atoms, B represents an alkylene group, for example an ethylene or propylene group, and n and n' are integers such that n+n' has a value of about 2 to about 12, (ii) a mixture of such amines having different groups R, the average number of carbon atoms in the groups R being from about 8 to about 22, or (iii) a mixture of such amines having different values of n and n', n and n' being integers such that the average value of n+n' in the mixture is about 2 to about 12, R having a single value or an average value as in a mixture (ii).

Commercially available amine surfactants within the above formula are often mixtures rather than single compounds. They include alkoxylated derivatives of "cocoamine" in which the groups R correspond to alkyl groups derived from various fatty acids including myristic, lauric, palmitic and stearic acids. The average number of carbon atoms in R in cocoamine is 12-14. Other examples are alkoxylated derivatives of "oleylamine", where the principal carbon chain of R corresponds to that of oleic acid (18 carbon atoms), and of "tallowamine" where R is mainly a mixture of hexadecyl and octadecyl. Such commercial surfactants are also usually mixtures of molecules having various values of n+n', and surfactants having a low average value of n+n' may contain a minor proportion of non-alkoxylated or mono-alkoxylated amines. The preferred alkoxylated derivatives are the ethoxylated derivatives.

In one embodiment, the alkylamine alkoxylate surfactant is an alkylamine ethoxylate having an average degree of ethoxylation of 2 to 8. In a preferred embodiment, the alkylamine ethoxylate surfactant comprises cocoamine ethoxylate having an average degree of ethoxylation of 2 to 8. In a preferred embodiment, the alkylamine ethoxylate surfactant comprises tallowamine ethoxylate having an average degree of ethoxylation of 2 to 12.

Pyrethroid insecticides can comprise concentrated formulations containing solid or encapsulated active ingredients and/or formulation aids and a surfactant composition comprising a) at least one phosphated arylphenol alkoxylate surfactant having an average degree of ethoxylation of from 4-8; and b) at least one alkylamine alkoxylate surfactant having an average degree of alkoxylation of from 2-12. The solid or encapsulated insecticidly active ingredients and/or formulation aids may be suspended or dispersed in the concentrated formulation. The concentrated formulations include capsule suspensions, oil dispersions, oil flowables, suspension concentrates, suspoemulsions and mixtures thereof. Depending on the product, the amounts of components a) and b) can vary widely. Component a) is present in an amount of 0.0001 to 95% by weight; and component b)

is present in an amount of 0.0001 to 95% by weight. The amounts of components a) and b) required will vary based on the nature, for example particle size, hyrdrophobicity etc., and amount of the solid or encapsulated active ingredients and/or formulation aids present in the composition. In a preferred embodiment, components a) and b) are present in a ratio of 20:1 to 1:20, preferably 4:1 to 1:4.

In an exemplary embodiment, a method is directed to improving control of cutworms or rootworms in corn. In this embodiment, the method includes applying, in-furrow at planting, an insecticidal composition comprising tefluthrin (available as Force CS insecticide, which is a capsule suspension formulation containing 23.4% tefluthrin (2.1 pounds/gal of tefluthrin)(available from Syngenta Crop Protection, LLC)). The insecticidal composition also contains a pop-up fertilizer having an N:P:K ratio, wherein N is in the range of 4 to 12; P is in the range of 12-40; and K is in the range of 1-10. Force CS insecticide may be applied in the range of 0.4 to 0.6 fl. oz./1000 ft. of row. Accordingly, tefluthrin may be applied, for example, in the range of about 0.1 lb/acre to about 0.15 lb/acre when using 30 inch row spacing. For lesser row spacing, more tefluthrin may be applied per acre, e.g. for 15 inch row spacing, tefluthrin may be applied in the range of about 0.2 lb/acre to about 0.25 lb/acre. Fertilizer may be applied in the range of about 2 gal/acre to about 10 gal/acre. Tefluthrin (e.g. Force CS insecticide) and pop-up fertilizer may also be mixed, such as described above or using other mixing methods known in the art, to create an insecticidal composition prior to application. In other examples, pyrethroids may be applied in granular form, e.g. granular tefluthrin available as Force 3G (available from Syngenta Crop Protection, LLC).

While the amounts of insecticidly active ingredients and formulation aids can readily be determined by one skilled in the art, based on inter alia the teachings contained herein, the benefits of the present invention are most clearly recognized when the insecticidly active ingredients or formulation aids are present in an amount such that proper dispersion occurs, for instance in-furrow at planting.

The following experiments demonstrate the efficacy and utility of the present inventions:

Experiment 1: Improved Control of Cutworm

Experimental Plots were established in a field to be planted with corn as follows. In a control plot, Force CS insecticide (contains tefluthrin) and water were mixed and applied in-furrow at planting. In a test plot, Force CS insecticide and pop-up fertilizer were mixed to form an insecticidal composition and applied at the rates described above, with water being applied at similar rates to the pop-up fertilizer.

Sampling was performed during the vegetative stage, e.g. V4 to V5. In the control plot, at least 10% cutworm damage was observed. In the Test plot, no cutworm damage was observed despite the detection of cutworms in close proximity.

Experiment 2: Control of Rootworm

Plastic trays (13×18×11.5 cm) with 4 holes in the bottom were filled with a filter paper and 400 mL Drench soil. 8 maize seeds (2 rows with 4 seeds each) were placed on the soil. Compound solution was applied with a track-sprayer at 200 L/ha. After drying seeds were covered with 200 mL untreated Drench soil and evened. Trays were incubated in a greenhouse chamber (25° C., 50% r.h., 14 h light (>20,000 lux)) and watered daily. 7 days after application each tray was infested with 10 (3 replicates) *Diabrotica balteata* larvae. After infestation all trays were covered with a plastic lid, which was perforated with 6-9 holes for ventilation. 5 days after infestation the survived larvae were counted. Also assessed was the larval growth (size difference between compound replicates and control). Treatments and results are summarized in Table 1 below. TEFL=Tefluthrin.

TABLE 1

| Compound | Fertilizer | ppm AI | Mortality (%) 5 DAI |
|---|---|---|---|
| Control (water, no AI) | 0 | 0 | 7 |

| Compound | Fertilizer | ppm AI | Corr. Mortality (%) 5 DAI |
|---|---|---|---|
| TEFL | 0 | 25 | 0 |
| TEFL | 0 | 50 | 0 |
| TEFL | 0 | 100 | 18 |
| TEFL | 0 | 200 | 86 |
| TEFL | 0 | 400 | 100 |
| TEFL | w/30% Nachurs 6-24-6 | 25 | 4 |
| TEFL | w/30% Nachurs 6-24-6 | 50 | 11 |
| TEFL | w/30% Nachurs 6-24-6 | 100 | 86 |
| TEFL | w/30% Nachurs 6-24-6 | 200 | 96 |
| TEFL | w/30% Nachurs 6-24-6 | 400 | 100 |
| TEFL | w/15% Nachurs 6-24-6 | 25 | 4 |
| TEFL | w/15% Nachurs 6-24-6 | 50 | 14 |
| TEFL | w/15% Nachurs 6-24-6 | 100 | 71 |
| TEFL | w/15% Nachurs 6-24-6 | 200 | 100 |
| TEFL | w/15% Nachurs 6-24-6 | 400 | 96 |

Experiment 3: Control of Cutworm

Plastic trays (13×18×11.5 cm) with 4 holes in the bottom were filled with a filter paper and 400 mL Drench soil. 8 maize seeds (2 rows with 4 seeds each) were placed on the soil. Compound solution was applied with a track-sprayer at 200 L/ha. After drying seeds were covered with 200 mL untreated Drench soil and evened. Trays were incubated in a greenhouse chamber (25° C., 50% r.h., 14 h light (>20'000 lux)) and watered daily. 7 days after application each tray was infested with 5 (6 replicates) *Agrotis ipsilon* larvae. After infestation all trays were covered with a plastic lid, which was perforated with 6-9 holes for ventilation. 5 days after infestation the survived larvae were counted. Also assessed was the larval growth (size difference between compound replicates and control). Treatments and results are summarized in Table 2 below. TEFL=Tefluthrin.

TABLE 2

| Compound | Fertilizer | ppm AI | Mortality (%) 5 DAI |
|---|---|---|---|
| Control (water, no AI) | 0 | 0 | 20 |

| Compound | Fertilizer | ppm AI | Corr. Mortality (%) 5 DAI |
|---|---|---|---|
| TEFL | 0 | 25 | 38 |
| TEFL | 0 | 100 | 25 |
| TEFL | 0 | 250 | 71 |
| TEFL | 0 | 500 | 92 |
| TEFL | 0 | 1000 | 100 |
| TEFL | w/30% Nachurs 6-24-6 | 25 | 25 |
| TEFL | w/30% Nachurs 6-24-6 | 100 | 29 |
| TEFL | w/30% Nachurs 6-24-6 | 250 | 79 |
| TEFL | w/30% Nachurs 6-24-6 | 500 | 96 |
| TEFL | w/30% Nachurs 6-24-6 | 1000 | 100 |
| TEFL | w/15% Nachurs 6-24-6 | 25 | 31 |
| TEFL | w/15% Nachurs 6-24-6 | 100 | 29 |
| TEFL | w/15% Nachurs 6-24-6 | 250 | 79 |

TABLE 2-continued

| Compound | Fertilizer | | ppm AI |
|---|---|---|---|
| TEFL | w/15% Nachurs 6-24-6 | 500 | 100 |
| TEFL | w/15% Nachurs 6-24-6 | 1000 | 100 |

Those skilled in the art having the benefit of this disclosure will readily appreciate that many modifications are possible in the exemplary embodiments without materially departing from the novel teachings and advantages of this invention. Accordingly, all such modifications are intended to be included within the scope of this invention.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

The invention claimed is:

1. A method of controlling insect damage in a corn plant, the method comprising:
    applying, at planting ±5 days, an insecticidal composition comprising:
        a tefluthrin insecticide; and
    about w/30% of a pop-up fertilizer,
        wherein the pop-up fertilizer is an N:P:K ratio fertilizer,
            wherein N is about 6, P is about 24, and K is about 6, and
        wherein the insect damage is damage from a rootworm.

2. The method of claim 1, further including forming the tefluthrin insecticide and the pop-up fertilizer into an insecticidal composition prior to applying the composition, wherein forming includes:
    depositing the tefluthrin insecticide, in liquid form, into a first reservoir;
    depositing the pop-up fertilizer, in liquid form, into a second reservoir; and
    pumping to a mixing chamber the tefluthrin insecticide and the fertilizer, thereby forming the insecticidal composition, prior to application.

3. The method of claim 2, wherein the tefluthrin insecticide further includes at least one phosphated arylphenol alkoxylate surfactant having an average degree of alkoxylation of from 4-8; and at least one alkylamine alkoxylate surfactant having an average degree of alkoxylation of from 2-12.

4. The method of claim 2, wherein the tefluthrin insecticide in the first reservoir is an insecticidal composition.

5. The method of claim 1, wherein the applying is on the same day as planting.

6. The method of claim 1, wherein the applying is in the same pass as planting.

7. The method of claim 1, wherein the applying is in-furrow.

8. The method of claim 1, wherein the tefluthrin insecticide (AI) is applied in the range of about 0.1 lb AI/acre to about 0.3 lb AI/acre.

9. The method of claim 1, wherein the pop-up fertilizer is applied in the range of about 3 lb nutrients/acre to about 50 lb nutrients/acre.

10. The method of claim 1, wherein the tefluthrin insecticide and the pop-up fertilizer are applied in a weight ratio in the range of 1:30 to 1:500.

11. The method of claim 1, wherein the ratio of the tefluthrin insecticide to the pop-up fertilizer is applied in a ratio of 0.01:15 to 0.01:30.

12. The method of claim 1, wherein the composition comprises about 25 to 400 ppm of tefluthrin.

13. The method of claim 1, wherein the composition comprises 30% of the pop-up fertilizer and the N:P:K fertilizer is 6:24:6.

14. A method of controlling rootworms in corn, the method comprising:
    applying, in-furrow at planting, an insecticide composition comprising
        tefluthrin; and
        about w/30% of a pop-up fertilizer having an N:P:K ratio, wherein
            N is about 6;
            P is about 24; and
            K is about 6.

15. The method of claim 14, wherein the insecticide composition is formed in the same pass as application, wherein forming includes
    pumping the tefluthrin from a first reservoir to a mixing chamber, and
    pumping the fertilizer from a second reservoir to the mixing chamber, thereby forming the insecticide composition.

16. The method of claim 14, wherein the composition comprises about 25 to 400 ppm of tefluthrin.

17. The method of claim 14, wherein the composition comprises 30% of the pop-up fertilizer and the N:P:K fertilizer is 6:24:6.

* * * * *